United States Patent
Kim

(10) Patent No.: US 8,195,572 B2
(45) Date of Patent: Jun. 5, 2012

(54) DRM CONTENT PLAYER AND PLAY METHOD FOR PORTABLE TERMINAL

(75) Inventor: Mun Seok Kim, Gyeongsangbuk-do (KR)

(73) Assignee: Samsung Electronics Co., Ltd (KR)

( * ) Notice: Subject to any disclaimer, the term of this patent is extended or adjusted under 35 U.S.C. 154(b) by 1175 days.

(21) Appl. No.: 11/871,592

(22) Filed: Oct. 12, 2007

(65) Prior Publication Data

US 2008/0097775 A1   Apr. 24, 2008

(30) Foreign Application Priority Data

Oct. 23, 2006   (KR) .................. 10-2006-0102773

(51) Int. Cl.
*G06F 17/00* (2006.01)

(52) U.S. Cl. .......................... 705/59; 705/51

(58) Field of Classification Search .................... 705/50, 705/59

See application file for complete search history.

(56) References Cited

U.S. PATENT DOCUMENTS

| | | | | |
|---|---|---|---|---|
| 4,688,169 | A * | 8/1987 | Joshi | 726/29 |
| 5,790,664 | A * | 8/1998 | Coley et al. | 709/203 |
| 6,915,427 | B2 * | 7/2005 | Maruyama et al. | 713/168 |
| 2003/0224768 | A1 | 12/2003 | Adjamah | |
| 2006/0155650 | A1 | 7/2006 | Oh et al. | |
| 2008/0040618 | A1 * | 2/2008 | Andersson et al. | 713/193 |

FOREIGN PATENT DOCUMENTS

| | | |
|---|---|---|
| KR | 1020050026131 | 3/2005 |
| KR | 1020060119021 | 11/2006 |

* cited by examiner

*Primary Examiner* — Calvin L Hewitt, II
*Assistant Examiner* — John M Winter
(74) *Attorney, Agent, or Firm* — The Farrell Law Firm, P.C.

(57) ABSTRACT

A Digital Rights Management (DRM) content player and play method for a portable terminal are disclosed. The DRM content player includes a first memory unit for storing a license stating usage rights upon an associated DRM content, and a content list of DRM contents, a second memory unit for storing the DRM content associated with the license, wherein the DRM content and associated license are received from an external source, a first controller for controlling the first memory unit, and finding a desired license in the first memory and sending the found license to the second memory unit, and a second controller for communicating with the first controller and controlling the second memory unit.

8 Claims, 6 Drawing Sheets

DRM CONTENT PLAYER AND PLAY METHOD FOR PORTABLE TERMINAL

PRIORITY

This application claims priority to an application entitled "DRM CONTENT PLAYER AND PLAY METHOD FOR PORTABLE TERMINAL" filed in the Korean Intellectual Property Office on Oct. 23, 2006, and assigned Serial No. 2006-0102773, the contents of which are incorporated herein by reference.

BACKGROUND OF THE INVENTION

1. Field of the Invention

The present invention relates generally to a portable terminal and, more particularly, to a Digital Rights Management (DRM) content player that has two processor/memory pairs and to a DRM content play method for the DRM content player.

2. Description of the Related Art

DRM relates to protection and management of copyrighted digital contents. Using cryptography, DRM aims to achieve secure delivery of various contents from content providers to users, and to prevent unauthorized redistribution of contents delivered to users. DRM supports the full life cycle of digital contents including creation, distribution, usage and retirement both in on-line and off-line states.

To use a DRM-protected content (or DRM content) in a portable terminal, the user of the portable terminal connects to a DRM content server and downloads a desired DRM content, metadata on the DRM content, and a license. The metadata provides information regarding the DRM content. The license contains a decryption key for decryption of the encrypted DRM content, and states usage rights upon the DRM content (for example, the number of content replays and expiration dates). After download of the DRM content with the associated metadata and license in the portable terminal, the user can use the downloaded DRM content within the usage rights stated in the license.

For a portable terminal having one control processor and one memory unit in which DRM contents and associated licenses are stored, when the user requests to play a DRM content, the associated license can be readily found.

However, in an advanced portable terminal that has two separate control processors each controlling an assigned memory unit, a DRM content and associated license may be stored in different memory units. Hence, to play DRM content, identification of the location of the associated license is necessary. In addition, one of the two control processors may not have a COmpressor/DECompressor (CODEC) necessary to play DRM content. Hence, sharing or transfer of a CODEC between the two control processors may be necessary.

Accordingly, in an advanced portable terminal that has two processors and two memory units, development of means for environment setting, inter-processor and inter-memory communication is necessary for DRM content playing.

SUMMARY OF THE INVENTION

The present invention has been made in view of the above problems, and an object of the present invention is to provide a DRM content player and play method for a portable terminal that perform necessary operations for playing DRM content according to a configuration of the portable terminal.

In accordance with the present invention, there is provided a DRM content play method for a DRM content player in a portable terminal, the DRM content player including a first memory unit assigned to a first controller and a second memory unit assigned to a second controller, the method including checking, in response to a play request for DRM content, by the second controller, whether a license stating usage rights upon the play-requested DRM content is present in the second memory unit, sending, if a license stating usage rights upon the play-requested DRM content is not present in the second memory unit, by the second controller, a request for the license to the first controller, finding, by the first controller, the requested license in the first memory unit, and sending the found license to the second controller, and playing, by the second controller, the play-requested DRM content using the received license.

In accordance with the present invention, there is provided a DRM content play method for a DRM content player in a portable terminal, the DRM content player including a first memory unit assigned to a first controller and a second memory unit assigned to a second controller, the method including checking, in response to a play request for a DRM content, whether a CODEC necessary for DRM content play is present in the second controller, sending, if a codec necessary for DRM content play is not present in the second controller, by the second controller, the play-requested DRM content to the first controller, finding, by the first controller, a license associated with the received DRM content in the first memory unit, and extracting the found license, and playing, by the first controller, the received DRM content using the extracted license.

In accordance with the present invention, there is provided a DRM content play method for a DRM content player in a portable terminal, the DRM content player including a first memory unit assigned to a first controller and a second memory unit assigned to a second controller, the method including checking, in response to a play request for a DRM content, whether a CODEC necessary for DRM content play is present in the first controller, forwarding, if a codec necessary for DRM content play is not present in the first controller, by the first controller, the play request for a DRM content to the second controller, sending, by the second controller, a request for a license associated with the DRM content to the first controller, finding, by the first controller, a license associated with the DRM content in the first memory unit, and sending the found license to the second controller, and playing, by the second controller, the play-requested DRM content using the received license.

In accordance with the present invention, there is provided a DRM content play method for a DRM content player in a portable terminal, the DRM content player including a first memory unit assigned to a first controller and a second memory unit assigned to a second controller, the method including checking, in response to a play request for a DRM content, whether a CODEC necessary for DRM content play is present in the first controller, forwarding, if a codec necessary for DRM content play is not present in the first controller, by the first controller, the play request for a DRM content to the second controller, sending, by the second controller, a request for a license associated with the DRM content to the first controller, finding, by the first controller, a license associated with the DRM content in the first memory unit, and sending the found license to the second controller, streaming, by the first controller, the DRM content stored in the first memory unit to the first controller, and playing, by the second controller, the streamed DRM content using the received license.

In accordance with the present invention, there is provided a DRM content player for a portable terminal, including a first memory unit for storing a license stating usage rights upon an associated DRM content, and a content list of DRM contents, a second memory unit for storing the DRM content associated with the license, wherein the DRM content and associated license are received from an external source, a first controller for controlling the first memory unit, and finding a desired license in the first memory and sending the found license to the second memory unit, and a second controller for communicating with the first controller and controlling the second memory unit.

BRIEF DESCRIPTION OF THE DRAWINGS

The above and other objects, features and advantages of the present invention will be more apparent from the following detailed description in conjunction with the accompanying drawings, in which.

DETAILED DESCRIPTION OF THE PREFERRED EMBODIMENTS

Figure 1:
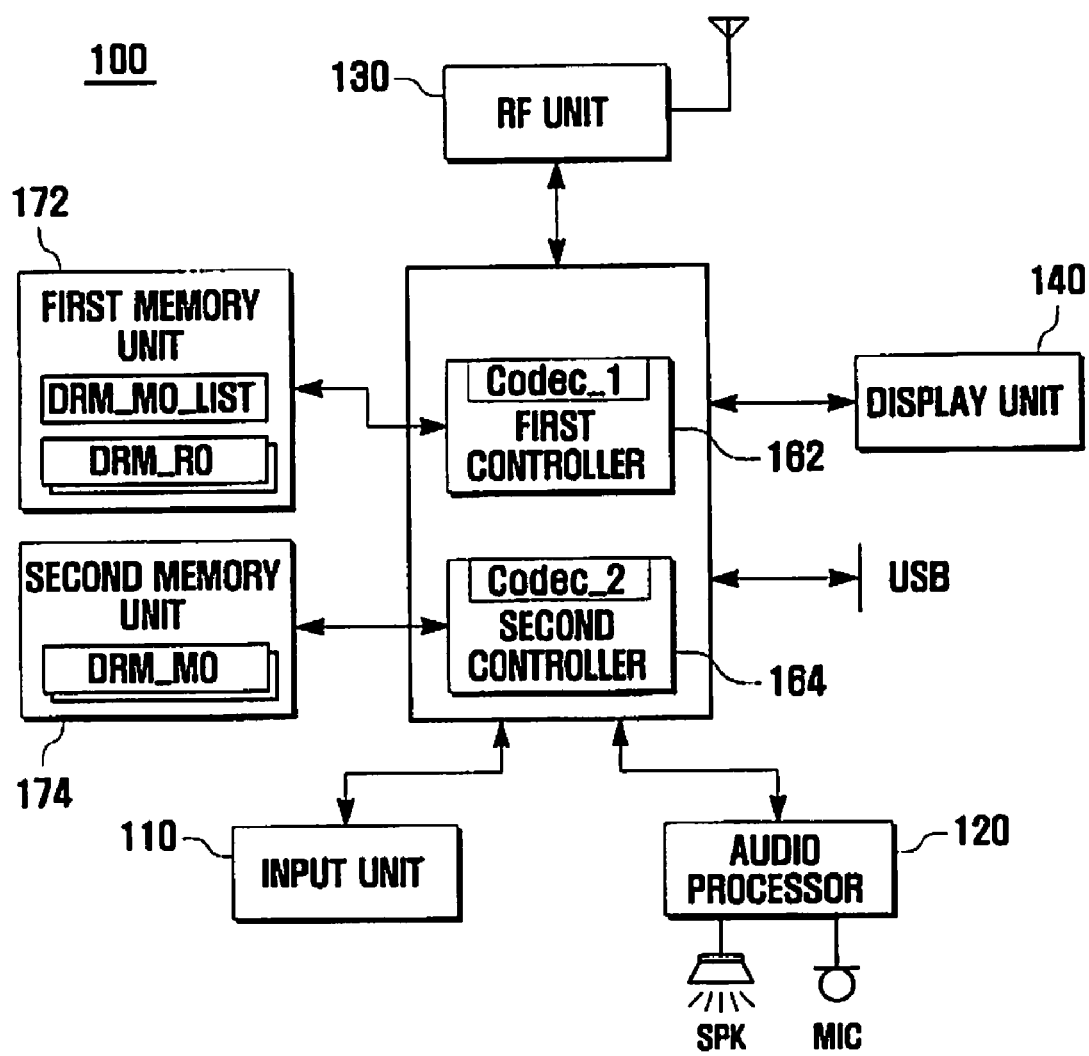
FIG. 1 illustrates a configuration of a portable terminal having a DRM content player according to the present invention.

Hereinafter, preferred embodiments of the present invention are described in detail with reference to the accompanying drawings. The same reference symbols identify the same or corresponding elements in the drawings. Detailed descriptions of constructions or processes known in the art may be omitted for the sake of clarity and conciseness. Particular terms may be defined to optimally describe the invention. Accordingly, the meaning of specific terms or words used in the specification and the claims should not be limited to the literal or commonly employed connotation, but should be construed in accordance with the spirit of the invention. The description herein is preferred only, and does not describe every possible instance of the invention. Therefore, it should be understood that various changes may be made and equivalents may be substituted for elements of the invention.

The present invention relates to a DRM content player and play method for a portable terminal. In particular, the portable terminal includes a call processor mainly for call processing, an application processor mainly for multimedia processing, a first memory unit assigned to the call processor, and a second memory unit assigned to the application processor. To efficiently play DRM contents in the portable terminal having the above configuration, the DRM content player and play method of the present invention provide an effective solution to environment settings and data transfer for license usage.

In the description, the portable terminal can play DRM content and may be any information and communication appliance and multimedia appliance, such as a game terminal, mobile communication terminal supporting a multimedia message service or multimedia mail service, wired/wireless phone, Personal Digital Assistant (PDA), smart phone, International Mobile Telecommunications 2000 (IMT 2000) terminal, Universal Mobile Telecommunications System (UMTS) terminal, Digital Multimedia Broadcasting (DMB) terminal, notebook, personal computer, Wideband Code Division Multiple Access (WCDMA) terminal, and portable Internet terminal. The present invention may also be applied to applications using such appliances.

FIG. 1 illustrates a configuration of a portable terminal 100 having a DRM content player according to the present invention.

Referring to FIG. 1, the portable terminal 100 includes a Radio Frequency (RF) unit 130, first controller 162, second controller 164, first memory unit 172, second memory unit 174, display unit 140, audio processor 120 and input unit 110.

The RF unit 130 performs communication operations related to call processing, access to a DRM content server through a Wireless Access Protocol (WAP) and Web, reception of data including a DRM content (DRM_MO) and associated license (DRM_RO) from the DRM content server. The RF unit 130 includes an RF transmitter for upconverting the frequency of a signal to be transmitted and amplifying the signal, and an RF receiver for low-noise amplifying a received signal and downconverting the frequency of the signal.

The first controller 162 and second controller 164 control the overall operation of the portable terminal 100 and signal exchange between internal elements thereof. The first controller 162 and second controller 164 may each include a MOdulator/DEModulator (MODEM) and a CODEC.

The first controller 162 mainly acts as a call processor that controls communication operations of the RF unit 130 related to a phone call, and to data transmission and reception. The first controller 162 reads/writes data from/to the first memory unit 172, and sends the read data to the second memory unit 174. The first controller 162 can include a first CODEC (Codec_1) for playing content data stored in the first memory unit 172 or in the second memory unit 174. The first controller 162 can control in part multimedia processing, and play DRM content stored in the portable terminal 100 or received by the RF unit 130.

The second controller 164 mainly acts as an application processor that processes multimedia features related to DMB, MPEG-1 Audio Layer 3 (MP3) audio file, gaming and camera for example. The second controller 164 reads/writes data from/to the second memory unit 174, and sends the read data to the first memory unit 172 if necessary. The second controller 164 can include a second CODEC (Codec_2) for playing content data stored in the first memory unit 172 or second memory unit 174. The second controller 164 controls the play of DRM content stored in the portable terminal 100 or received by the RF unit 130.

The first controller 162 and second controller 164 communicate with each other through various communication schemes such as Inter-Process Communication (IPC). Communication between the first controller 162 and second controller 164 for DRM content play is described later.

The first memory unit 172 and second memory unit 174 store application programs for the operation of the portable terminal 100, downloaded DRM contents, and data generated by the user, and provide buffering means for streaming DRM content in a streaming service. The first memory unit 172 and second memory unit 174 each include a program memory section and a data memory section.

The program memory section of the first memory unit 172 stores, preferably, an Operating System (OS) for booting the portable terminal 100, and application programs for playing multimedia contents, and stores, if necessary, application programs for supplementary functions related to a camera, audio, still or moving images. When one of these functions is activated in response to a user request, the portable terminal 100 executes a corresponding application program under the control of the first controller 162.

The program memory section of the second memory unit 174 stores, preferably, application programs for playing multimedia contents, application programs for supplementary functions related to a camera, audio files, still or moving images, and stores, if necessary, an OS for booting the portable terminal 100. When one of these functions is activated in response to a user request, the portable terminal 100 executes a corresponding application program under the control of the second controller 164.

The data memory sections of the first memory unit 172 and second memory unit 174 store user data generated from operation of the portable terminal 100. The user data may include multimedia contents downloaded from a content server, materials related to the supplementary functions such as photographed still and moving images, phone books and audio data, and descriptive data regarding various types of data.

In particular, the first memory unit 172 stores a content list of DRM contents (DRM_MO_List), and licenses (DRM_RO) stating usage rights upon associated DRM contents. The second memory unit 174 stores DRM contents in the content list. The first memory unit 172 and second memory unit 174 can each store all of the content list, the DRM contents and the licenses. However, considering the different roles of the first controller 162 and the second controller 164, and different storage capacities of the first memory unit 172 and second memory unit 174, the second memory unit 174 preferably stores data related to multimedia functions, and the first memory unit 172 preferably stores a content list and licenses necessary to perform the multimedia functions.

The display unit 140 displays various menus of the portable terminal 100, information input by the user, and information to be provided to the user. In response to a user request, the display unit 140 displays downloaded DRM content or streaming DRM content. The display unit 140 may include a panel of Liquid Crystal Display (LCD) devices. If the panel has a touch screen capability, the display unit 140 can also act as an input means.

The audio processor 120 reproduces through a SPeaKer SPK an audio signal generated during the play of DRM content, and sends an audio signal such as a voice signal from a MICrophone MIC to the first controller 162 and second controller 164.

The input unit 110 can include a key input section, Universal Serial Bus (USB) interface section, and other signal input sections. The key input section includes a plurality of alphanumeric and function keys for inputting alphanumeric information and setting various functions. The function keys may include direction, side, and shortcut keys associated with particular functions. The key input section sends a key signal, input by the user for setting and controlling operations of the portable terminal 100, to the first controller 162 and second controller 164. For example, the key input section receives a play request signal for initiation of the play of DRM content, event signals such as pause, stop, fast forward, rewind and record for controlling play of the DRM content, and sends the received signals to the first controller 162 and second controller 164. The USB interface section enables the portable terminal 100 to receive various data, such as audio and video data, and a codec for play of the audio data and video data, from an external device, and to store the received data in the first memory unit 172 or second memory unit 174. The other signal input section is an input means other than a keypad or USB interface. If the display unit 140 has touch screen capability, it can be an example of the other signal input section that generates a touch event signal.

Figure 2:
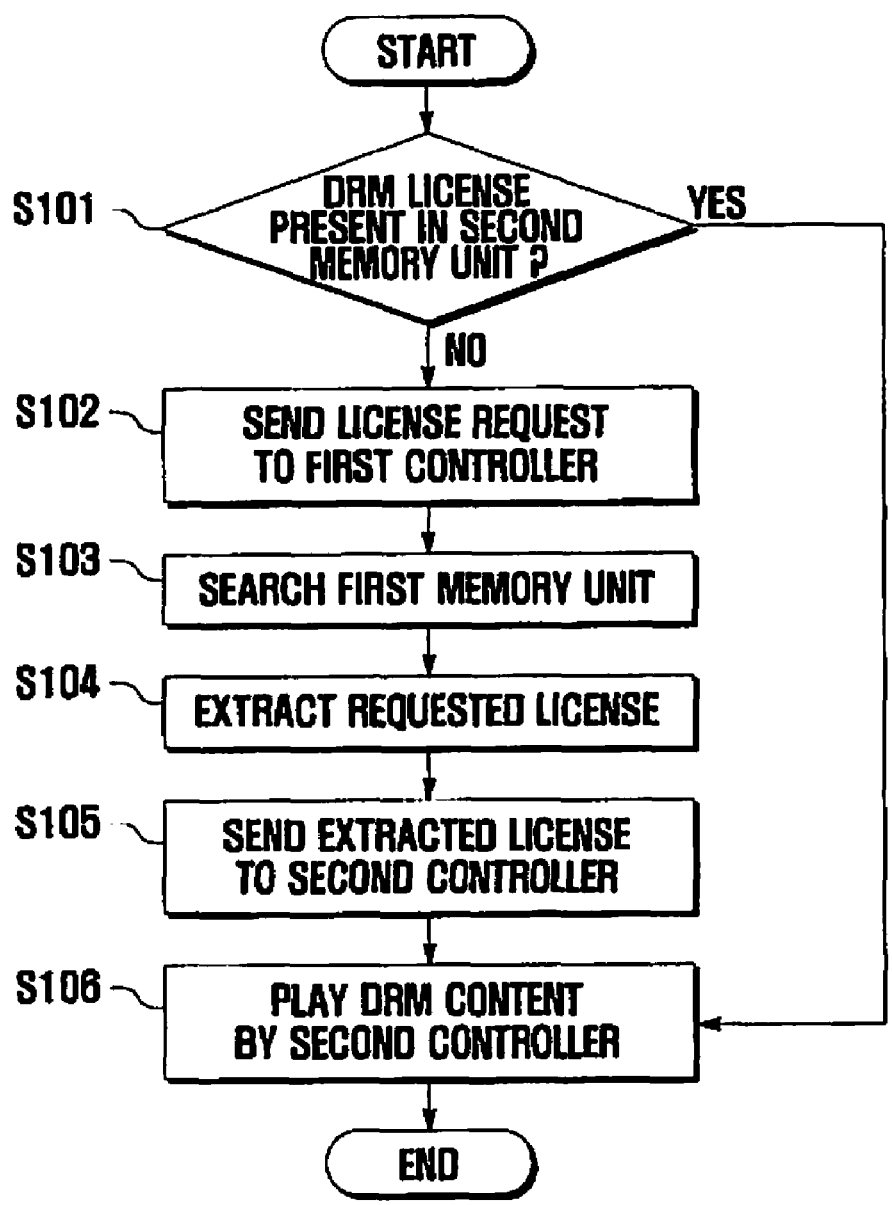
FIG. 2 is a flow chart illustrating a DRM content play method according to a first embodiment of the present invention.

FIG. 2 is a flow chart illustrating a DRM content play method according to a first embodiment of the present invention. In FIG. 2, a content list of DRM contents (DRM_MO_List) and licenses (DRM_RO) associated with DRM contents are stored in the first memory unit 172, actual DRM contents are stored in the second memory unit 174, and play-requested DRM content is played by the second controller 164. Referring to FIGS. 1 and 2, the DRM content play method is described as follows.

When the user requests to play DRM content through the input unit 110, the second controller 164, having a necessary CODEC, checks whether a DRM license associated with the requested DRM content is present in the second memory unit 174 (S101). If a DRM license associated with the requested DRM content is not present in the second memory unit 174, the second controller 164 sends to the first controller 162 a DRM license request containing a content identifier of the requested DRM content through IPC (S102). Preferably, a content identifier corresponds to the filename of a DRM content registered in the content list.

The first controller 162 searches the first memory unit 172 to find a DRM license corresponding to the received content identifier (S103), extracts the found DRM license (S104), and sends the extracted DRM license to the second controller 164 through IPC (S105). The second controller 164 then plays the requested DRM content using the received DRM license (S106). The received DRM license can be stored in the second memory unit 174 for later use.

Figure 3:
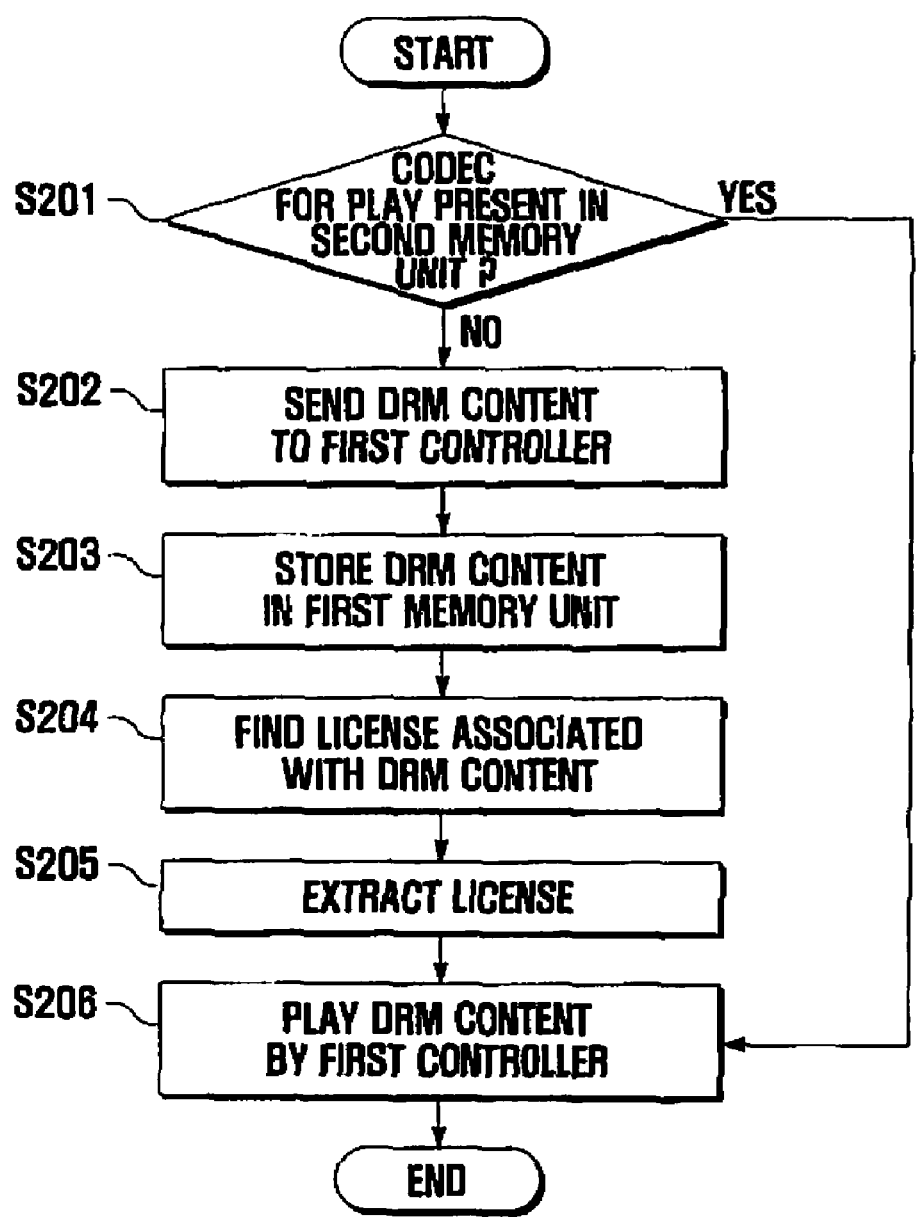
FIG. 3 is a flow chart illustrating a DRM content play method according to a second embodiment of the present invention.

FIG. 3 is a flow chart illustrating a DRM content play method according to a second embodiment of the present invention. In FIG. 3, a content list of content DRM contents (DRM_MO_List) and licenses (DRM_RO) associated with DRM contents are stored in the first memory unit 172, actual DRM contents are stored in the second memory unit 174, and play-requested DRM content is played by the first controller 162. The method of FIG. 3 may be applied to setting and play of a ring tone in the portable terminal 100. Referring to FIGS. 1 and 3, the DRM content play method is described as follows.

When the user requests to play DRM content through the input unit 110, the second controller 164 checks the presence of a necessary CODEC for DRM content play (S201). If a necessary CODEC is not present in the second controller 164, the second controller 164 sends the play-requested DRM content to the first controller 162 having the necessary CODEC (S202).

The first controller 162 stores the received DRM content in the first memory unit 172 (S203). When the first controller 162 immediately plays the received DRM content without storing the received DRM content, step S203 may be skipped.

The first controller 162 searches the first memory unit 172 to find a DRM license associated with the DRM content using a content identifier of the DRM content and the content list (S204), and extracts the found DRM license from the first memory unit 172 (S205).

The first controller 162 then plays the DRM content that is sent, for example through IPC, by the second controller 164, using the extracted DRM license (S206).

Figure 4:
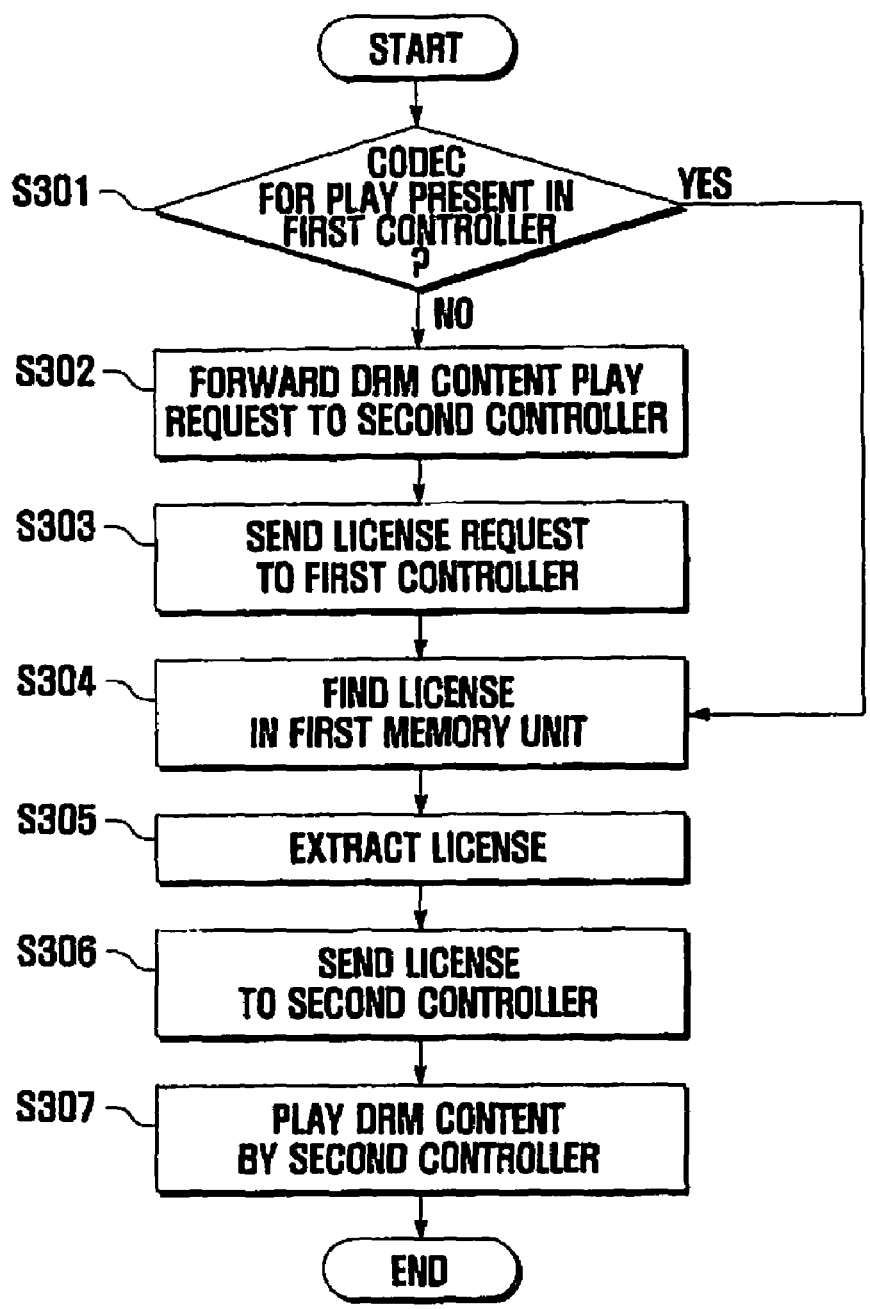
FIG. 4 is a flow chart illustrating a DRM content play method according to a third embodiment of the present invention.

FIG. 4 is a flow chart illustrating a DRM content play method according to a third embodiment of the present invention. In FIG. 4, a content list of DRM contents (DRM_MO_List) and licenses (DRM_RO) associated with DRM contents are stored in the first memory unit 172, actual DRM contents are stored in the second memory unit 174, and a play request for a DRM content occurs to the first controller 162 not having a necessary CODEC. The method of FIG. 4 may be applied to setting and play of a ring tone in the portable terminal 100. Referring to FIGS. 1 and 4, the DRM content play method is described as follows.

When the user requests to play DRM content through the input unit 110 or when an incoming call is received by the RF unit 130 in a ring tone mode set by the user, the first controller 162 checks the presence of a necessary CODEC for DRM content play or ring tone generation in step S301. If a necessary CODEC is not present in the first controller 162, the first controller 162 forwards the DRM content play request to the second controller 164 through, for example, IPC in step S302.

The second controller 164 sends to the first controller 162 a DRM license request containing a content identifier of the play-requested DRM content in step S303.

The first controller 162 searches the first memory unit 172 to find a DRM license associated with the DRM content using the content identifier and the content list in step S304, extracts the found DRM license from the first memory unit 172 in step S305, and sends the extracted DRM license to the second controller 164 in step S306.

The second controller 164 stores the received DRM license in the second memory unit 174 for later use, and plays the requested DRM content using the received DRM license in step S307.

Figure 5:
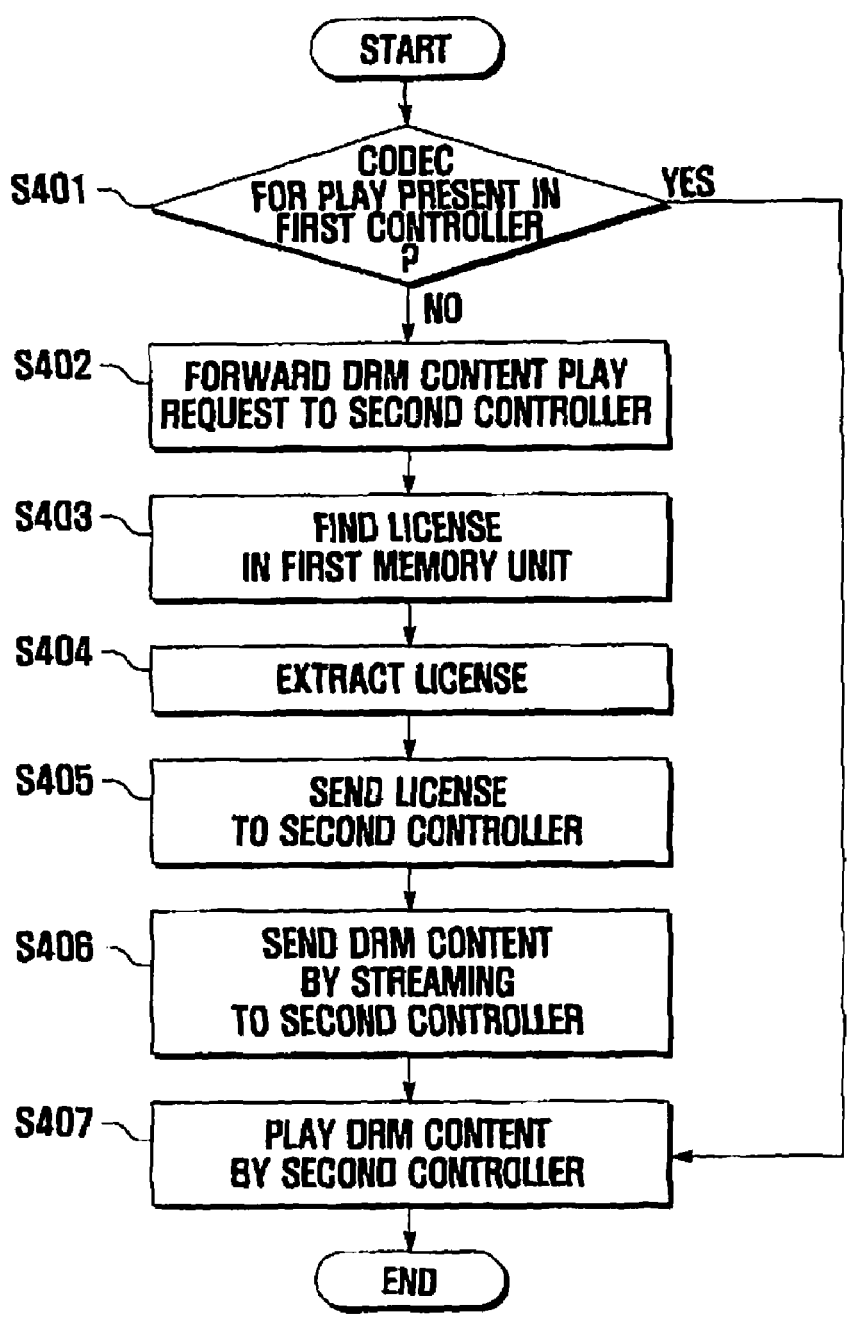
FIG. 5 is a flow chart illustrating a DRM content play method according to a fourth embodiment of the present invention.

FIG. 5 is a flow chart illustrating a DRM content play method according to a fourth embodiment of the present invention. In FIG. 5, DRM contents, a content list of DRM contents (DRM_MO_List), and licenses (DRM_RO) associated with DRM contents are stored in the first memory unit 172, and a play request for DRM content is made to the first controller 162 not having a necessary CODEC. Referring to FIGS. 1 and 5, the DRM content play method is described as follows.

When the user requests to play DRM content through the input unit 110, the first controller 162 checks the presence of a necessary CODEC for DRM content play in step S401. If a necessary CODEC is not present in the first controller 162, the first controller 162 forwards the DRM content play request to the second controller 164 in step S402.

The first controller 162 searches the first memory unit 172 to find a DRM license associated with the play-requested DRM content in step S403, extracts the found DRM license from the first memory unit 172 in step S404, and sends the extracted DRM license to the second controller 164 in step S405.

The first controller 162 streams the play-requested DRM content to the second controller 164 in step S406. The second controller 164 plays the streamed DRM content in real time using the received DRM license in step S407.

Figure 6:
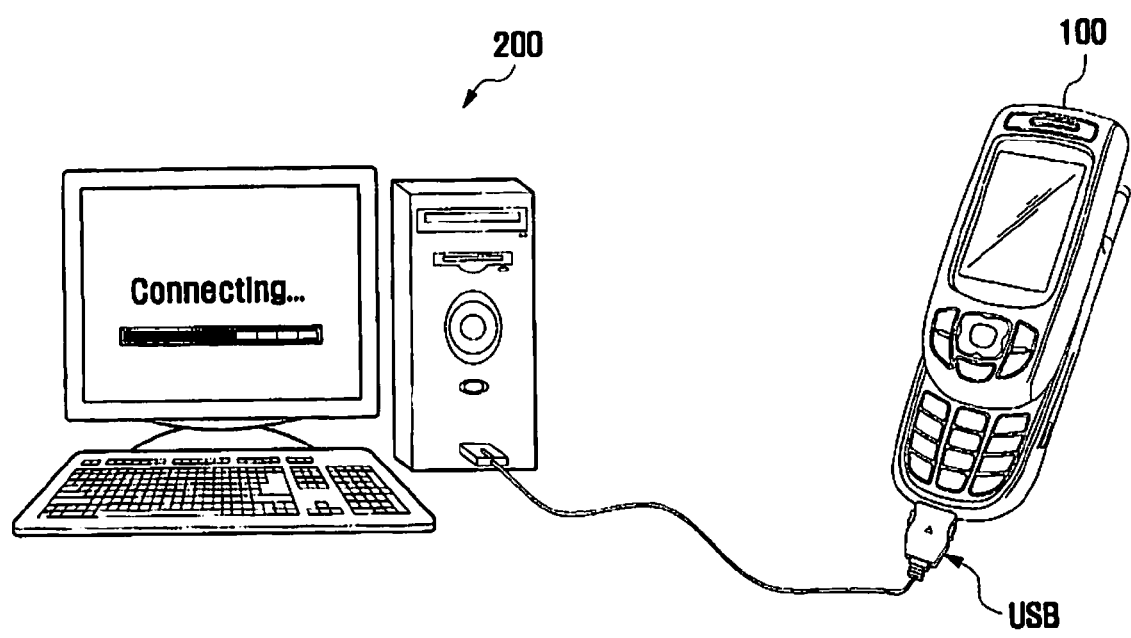
FIG. 6 illustrates an example of connection between a portable terminal and a computer for DRM content downloading.

FIG. 6 illustrates an example of connection between a portable terminal and a computer for DRM content downloading. In FIG. 6, the portable terminal 100 having a DRM content player is connected through a USB cable or a local area network to the computer 200 in order to download desired DRM content, an associated license and a CODEC for playing the DRM content. For authentication, the portable terminal 100 may have to transmit terminal identification information to the computer 200 before content downloading.

The second controller 164 of the portable terminal 100 downloads a plurality of DRM contents, associated licenses and a content list of the DRM contents from the computer 200, and forwards the downloaded content list and licenses via the first controller 162 by means of IPC to the first memory unit 172 for storage. Alternatively, the first controller 162 downloads the content list and licenses from the computer 200 to the first memory unit 172 for storage, and the second controller 164 downloads the DRM contents from the computer 200 to the second memory unit 174 for storage. If a CODEC necessary for DRM content play is present in the first controller 162, the downloaded DRM contents can be stored in the first memory unit 172.

Although, in the description, CODECs are present in the first controller 162 and second controller 164, they may be stored in first memory unit 172 and second memory unit 174, and activated for use under the control of the associated controllers if necessary.

As apparent from the above description, the present invention provides a DRM content player and play method for a portable terminal that perform necessary operations for DRM content play according to a configuration of the portable terminal.

While preferred embodiments of the present invention have been shown and described in this specification, it will be understood by those skilled in the art that various changes or modifications of the embodiments are possible without departing from the spirit and scope of the invention as defined by the appended claims.

What is claimed is:

1. A DRM content play method for a DRM content player in a portable terminal, the DRM content player including a first controller, a second controller, a first memory unit assigned to the first controller and a second memory unit assigned to the second controller, the method comprising:
receiving a play request for content by the first controller;
determining by the first controller that a first codec for the content is not present in the first memory;
forwarding the play request to the second controller by the first controller;
sending by the second controller a request, comprising a content identifier, for a license to the first controller;
determining by the first controller the license using the content identifier and sending the license to the second controller, and
playing the content by the second controller using the license.

2. The DRM content play method of claim 1, further comprising:
storing the license in the first memory unit; and
storing the DRM content in the second memory unit.

3. A Digital Rights Management (DRM) content player in a portable terminal, the DRM content player including a first controller, a second controller, a first memory unit assigned to the first controller and a second memory unit assigned to the second controller, comprising:
a processor;
memory storing executable instructions that when executed by the processor causes the processor to perform the steps of:
receiving a play request for content by the first controller;
determining by the first controller that a first codec for the content is not present in the first memory;
forwarding the play request to the second controller by the first controller;
sending by the second controller a request, comprising a content identifier, for a license to the first controller;

determining by the first controller the license using the content identifier and sending the license to the second controller, and playing the content by the second controller using the license.

4. The DRM content player of claim 3, further comprising:
a Radio Frequency (RF) unit for transmitting and receiving a call signal, and forming a communication channel to receive DRM content and associated license from an external source;
an input unit for receiving the play request for the DRM content;
an audio processor for processing an audio signal of the DRM content being played;
a display unit for processing a video signal of the DRM content being played; and
a Universal Serial Bus (USB) interface for connecting to an external device to receive the DRM content and associated license.

5. The DRM content player of claim 3, wherein the first controller and the second controller each have a COmpressor/DECompressor (CODEC) necessary for DRM content play.

6. The DRM content player of claim 4, wherein the first controller controls transmission and reception of a call signal through the RF unit.

7. The DRM content player of claim 3, wherein the DRM content is a ring tone generation content for the portable terminal.

8. The DRM content player of claim 3, further comprising a digital multimedia broadcast receiving module, a camera module and an MPEG-1 Audio Layer 3 (MP3) module, and wherein the second controller controls multimedia features of the digital multimedia broadcast receiving module, camera module and MP3 module.

* * * * *